US009837113B2

(12) United States Patent
Takemoto et al.

(10) Patent No.: US 9,837,113 B2
(45) Date of Patent: Dec. 5, 2017

(54) SPINDLE MOTOR AND DISK DRIVE APPARATUS

(71) Applicant: Nidec Corporation, Kyoto (JP)

(72) Inventors: Mitsuhiro Takemoto, Kyoto (JP);
Tsuchitsugu Watanabe, Kyoto (JP);
Hiroyuki Abe, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 228 days.

(21) Appl. No.: 14/690,587

(22) Filed: Apr. 20, 2015

(65) Prior Publication Data

US 2016/0190875 A1    Jun. 30, 2016

Related U.S. Application Data

(60) Provisional application No. 62/097,627, filed on Dec. 30, 2014.

(30) Foreign Application Priority Data

Dec. 25, 2014   (JP) .................................. 2014-262734

(51) Int. Cl.
*G11B 19/20*   (2006.01)
*H02K 1/18*   (2006.01)

(52) U.S. Cl.
CPC .......... *G11B 19/2009* (2013.01); *H02K 1/187* (2013.01); *G11B 19/20* (2013.01)

(58) Field of Classification Search
CPC ....... G11B 19/20; G11B 19/2009; H02K 1/12
USPC ........................................................ 360/99.08
See application file for complete search history.

(56) References Cited

U.S. PATENT DOCUMENTS

| 6,455,961 B1* | 9/2002 | Higuchi | ................ | H02K 1/187 310/216.113 |
| 6,921,993 B2* | 7/2005 | Xu | ........................ | H02K 1/146 310/216.045 |
| 2009/0021104 A1 | 1/2009 | Hattori | | |
| 2011/0096437 A1* | 4/2011 | Nagai | ................ | G11B 19/2018 360/135 |
| 2013/0222946 A1 | 8/2013 | Nagai et al. | | |

FOREIGN PATENT DOCUMENTS

| JP | 06-335216 A | 12/1994 |
| JP | 07-264805 A | 10/1995 |
| JP | 08-228465 A | 9/1996 |
| JP | 11-004568 A | 1/1999 |
| JP | 11-206062 A | 7/1999 |
| JP | 2003-244890 A | 8/2003 |

* cited by examiner

*Primary Examiner* — Carlos E Garcia
(74) *Attorney, Agent, or Firm* — Keating & Bennett, LLP (57) ABSTRACT

A stationary portion of a spindle motor includes a stator portion and an outside surface. The stator portion includes a stator core and coils. The outside surface extends in an axial direction parallel or substantially parallel to a central axis, and is centered on the central axis. The spindle motor includes a fixing portion at which an inside surface of the stator core and the outside surface are fixed to each other. The fixing portion includes a first press fit portion, a second press fit portion, and a gap arranged therein. The gap is located between the first press fit portion and the second press fit portion. The second press fit portion is located above the first press fit portion. At least a portion of the second press fit portion is located above a middle of the stator core in the axial direction.

16 Claims, 6 Drawing Sheets

SPINDLE MOTOR AND DISK DRIVE APPARATUS

BACKGROUND OF THE INVENTION

1. Field of the Invention

The present invention relates to a spindle motor and more specifically to a disk drive apparatus including a spindle motor.

2. Description of the Related Art

A disk drive apparatus, such as, for example, a hard disk drive, includes a spindle motor arranged to rotate a recording disk. A spindle motor described in JP-A 8-228465 includes a frame and a stator core fixed to the frame. The frame includes an increased diameter portion and a decreased diameter portion defined in a circumferential surface thereof. The stator core is lightly press fitted to the increased diameter portion. In addition, an adhesive is arranged in a gap between the decreased diameter portion and an inner circumferential surface of the stator core.

As illustrated in FIG. 1(B) of JP-A 8-228465, an upper portion of the stator core is fixed to the frame through the adhesive. The upper portion of the stator core is fixed to the frame with lower strength than a lower portion of the stator core, which is slightly press fitted thereto. Thus, an exciting force due to a driving torque may cause a deformation of the stator core, which may cause a vibration of the spindle motor.

SUMMARY OF THE INVENTION

A spindle motor according to a preferred embodiment of the present invention includes a stationary portion, and a rotating portion configured to rotate about a central axis extending in a vertical direction with respect to the stationary portion.

The stationary portion includes a stator portion and an outside surface. The stator portion includes a stator core including a plurality of tooth portions, and coils wound around the plurality of tooth portions. The outside surface extends in an axial direction parallel or substantially parallel to the central axis and is centered on the central axis.

The spindle motor includes a fixing portion at which an inside surface of the stator core and the outside surface are fixed to each other. The fixing portion includes a first press fit portion, a second press fit portion, and a gap arranged therein. The gap is located between the first press fit portion and the second press fit portion. The second press fit portion is located above the first press fit portion. At least a portion of the second press fit portion is located above a middle of the stator core in the axial direction.

According to preferred embodiments of the present invention, a spindle motor and a disk drive apparatus which are able to achieve reduced vibration are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, with reference to the accompanying drawings, preferred embodiments of the present invention will be described below. Note that the scope of the present invention is not limited to the preferred embodiments described below, but include any modification thereof within the scope of the technical idea of the present invention. Also note that a scale, numbers, and so on of members or portions illustrated in the following drawings may differ from those of actual members or portions, for the sake of easier understanding of the members or portions.

In the following drawings, an xyz coordinate system is shown appropriately as a three-dimensional orthogonal coordinate system. In the xyz coordinate system, a z-axis direction is assumed to be a direction parallel or substantially parallel to a central axis J extending in a vertical direction in FIG. 1. A y-axis direction is assumed to be a direction perpendicular or substantially perpendicular to a z-axis. An x-axis direction is assumed to be a direction perpendicular or substantially perpendicular to both the z-axis and a y-axis. Note that the wording "parallel direction" as used herein includes both parallel and substantially parallel directions. Also note that the wording "perpendicular" as used herein comprehends both "perpendicular" and "substantially perpendicular".

Also note that, in the following description, a positive side (i.e., a +z side) in the z-axis direction will be referred to as an "upper side", and a negative side (i.e., a −z side) in the z-axis direction will be referred to as a "lower side". It should be noted, however, that the above definitions of the vertical direction and the upper and lower sides are not meant to indicate relative positions or directions of different members or portions when those members or portions are actually installed in a device. Also note that, in the following description, the relative positions and directions of different members or portions will be defined based on the central axis J. Unless otherwise specified, the direction parallel or substantially parallel to the central axis J (i.e., the z-axis direction) will be simply referred to by the term "axial direction", "axial", or "axially", radial directions centered on the central axis J will be simply referred to by the term "radial direction", "radial", or "radially", and a circumferential direction about the central axis J will be simply referred to by the term "circumferential direction", "circumferential", or "circumferentially".

Figure 1:
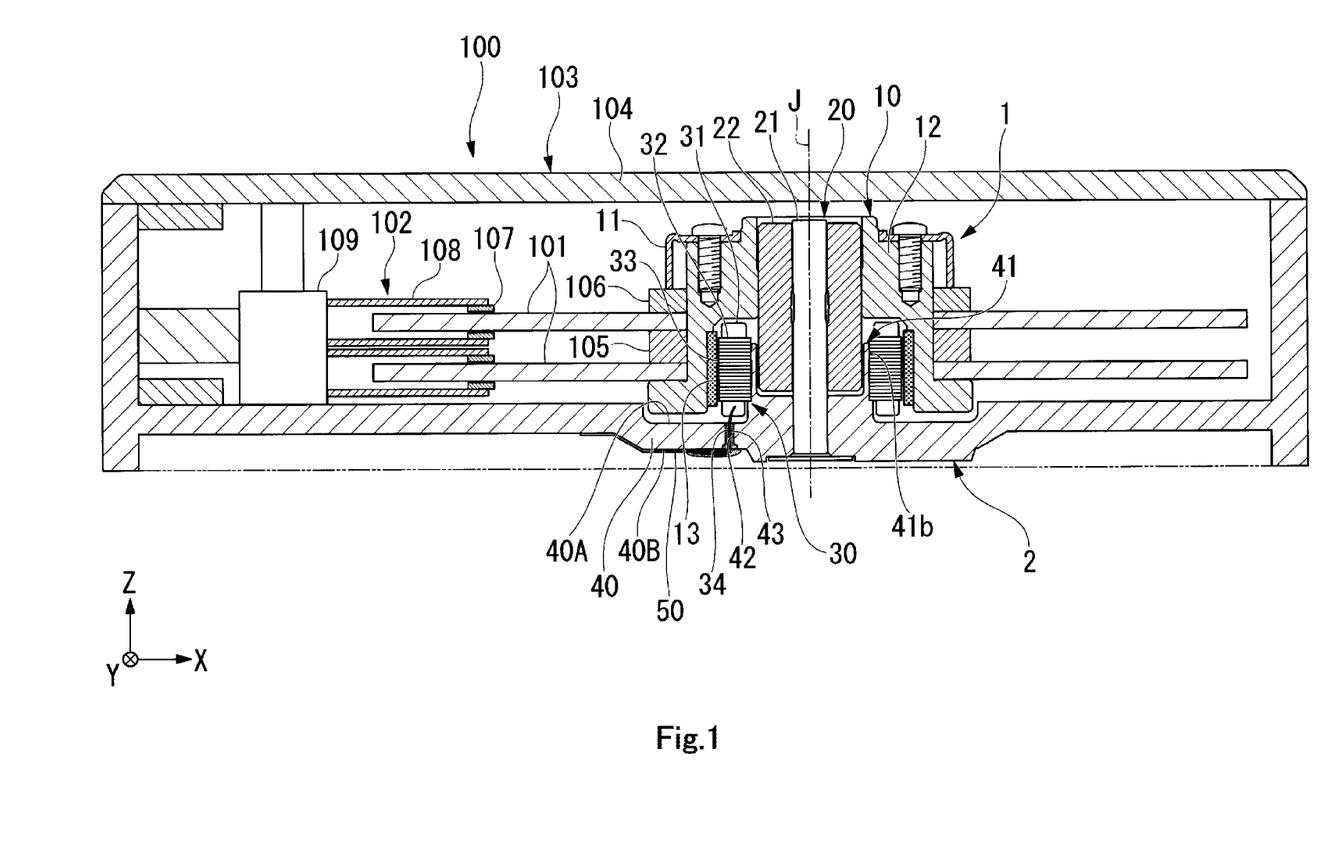
FIG. 1 is a vertical cross-sectional view illustrating a disk drive apparatus including a spindle motor according to a preferred embodiment of the present invention.

FIG. 1 is a vertical cross-sectional view illustrating a disk drive apparatus 100 including a spindle motor 1 according to a preferred embodiment of the present invention.

The disk drive apparatus 100 is a hard disk drive. The disk drive apparatus 100 preferably includes the spindle motor 1, disks 101, and an access portion 102. The spindle motor 1 is configured to rotate the disks 101, on which information is recorded, about the central axis J. The access portion 102 is arranged to perform at least one of reading and writing of information from or to the disks 101.

The disk drive apparatus 100 includes a housing 103. The housing 103 preferably includes a base portion 40 of the spindle motor 1, and a cover member 104. The cover member 104 is fitted to an opening of the base portion 40 to define the housing 103. The disks 101 and the access portion 102 are accommodated in the housing 103. An interior space of the housing 103 is preferably filled with, for example, a helium gas. Note that the interior space of the housing 103 may alternatively be filled with a hydrogen gas, air, or the like.

The disk drive apparatus 100 includes the plurality of disks 101. The disk drive apparatus 100 includes a spacer 105 located between the disks 101. The plurality of disks 101 are supported by the spindle motor 1. More specifically, the plurality of disks 101 are supported by a rotating portion 10 of the spindle motor 1. The rotating portion 10 includes a clamp member 11 configured to support the plurality of disks 101. The disk drive apparatus 100 includes a spacer 106 located between the clamp member 11 and the disks 101. The plurality of disks 101 are configured to rotate about the central axis J together with the rotating portion 10.

The access portion 102 preferably includes heads 107, arms 108, and a head actuator mechanism 109. Each of the heads 107 is arranged in close proximity to a surface of one of the disks 101 to magnetically perform at least one of the reading and the writing of information. Each head 107 is supported by an associated one of the arms 108. Each arm 108 is supported by the head actuator mechanism 109.

The spindle motor 1 includes a stationary portion 2 and the rotating portion 10, which is configured to rotate about the central axis J extending in the vertical direction with respect to the stationary portion 2. The stationary portion 2 preferably includes an outside surface 41b described below, a shaft 21 of a bearing portion 20, a stator portion 30, the base portion 40, and a circuit board 50. The rotating portion 10 preferably includes a sleeve 22 of the bearing portion 20, the clamp member 11, a rotor hub 12, and a rotor magnet 13.

The bearing portion 20 is configured to support the rotor hub 12 such that the rotor hub 12 is rotatable about the central axis J. The bearing portion 20 preferably includes the shaft 21 and the sleeve 22. The shaft 21 is fixed to the base portion 40. The shaft 21 and the sleeve 22 are positioned opposite to each other with a gap therebetween. A fluid, such as, for example, a lubricating oil or a gas, is preferably arranged in the gap.

The stator portion 30 includes coils 31 and a stator core 32. Each coil 31 is arranged opposite to the rotor magnet 13 with a gap therebetween. The stator core 32 is preferably a laminated structure defined by laminated magnetic bodies. The stator core 32 includes a plurality of tooth portions 33. The plurality of tooth portions 33 extend radially outward. The coils 31 are wound around the plurality of tooth portions 33.

The base portion 40 preferably includes an upper surface 40A and a lower surface 40B. The base portion 40 is configured to support the stator portion 30 on the upper surface 40A. The upper surface 40A is a surface facing an inside of the housing 103. The base portion 40 includes a cylindrical portion 41 and a base portion through hole 42. The cylindrical portion 41 is located on the upper surface 40A of the base portion 40. The cylindrical portion 41 is preferably tubular, and extends in an axial direction. As mentioned above, the stationary portion 2 includes the outside surface 41b, and more specifically, the cylindrical portion 41 includes the outside surface 41b, which extends in the axial direction and is centered on the central axis J. A wall surface of the stationary portion 2 which defines the outside surface 41b will be hereinafter referred to as the outside surface 41b of the cylindrical portion 41. Note that the cylindrical portion 41 may not necessarily be tubular, but may alternatively be polygonal.

The base portion through hole 42 passes through the base portion 40 from the upper surface 40A to the lower surface 40B thereof. The lower surface 40B is a surface facing an outside of the housing 103. Lead wires 34 from the coils 31 are passed through the base portion through hole 42. The spindle motor 1 preferably includes a sealant 43 arranged to fill a gap between the base portion through hole 42 and the lead wires 34. The circuit board 50 is located on the lower surface 40B of the base portion 40. The circuit board 50 is connected with the lead wires 34, which are drawn out below the lower surface 40B through the base portion through hole 42.

Figure 2:
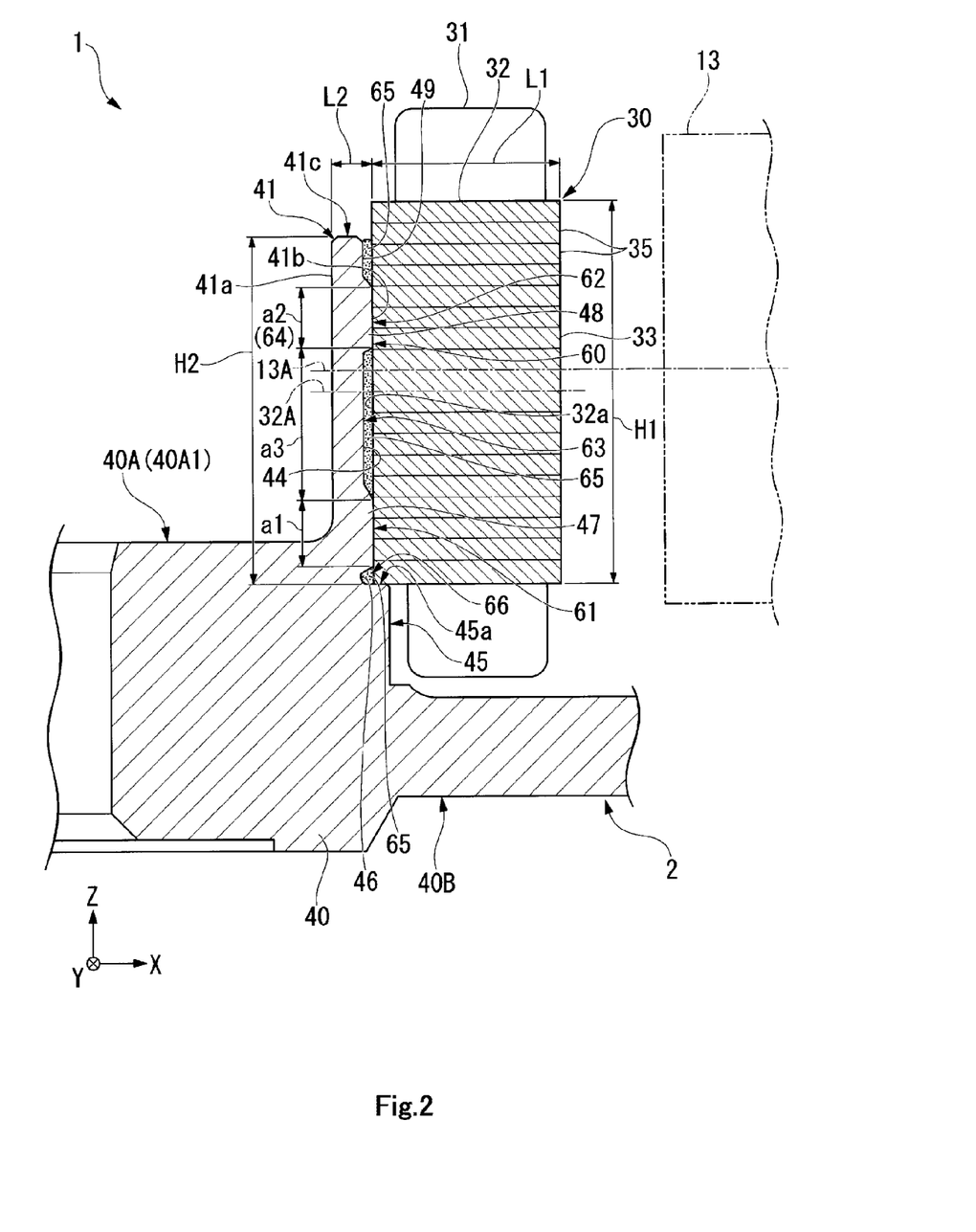
FIG. 2 is a vertical cross-sectional view illustrating a fixing portion according to a preferred embodiment of the present invention.

FIG. 2 is a vertical cross-sectional view illustrating a fixing portion 60 according to a preferred embodiment of the present invention.

The spindle motor 1 includes the fixing portion 60 at which an inside surface 32a of the stator core 32 and the outside surface 41b are fixed to each other. More specifically, as illustrated in FIG. 2, the spindle motor 1 includes the fixing portion 60 at which the inside surface 32a of the stator core 32 and the outside surface 41b of the cylindrical portion 41 are fixed to each other. A first press fit portion 61, a second press fit portion 62, and a gap 63 are preferably provided in the fixing portion 60. The stator core 32 is press fitted to the outside surface 41b of the cylindrical portion 41. An area over which the stator core 32 and the outside surface 41b are press fitted to each other in the fixing portion 60 will be referred to as a "press fit portion". Each of the first press fit portion 61, the second press fit portion 62, and the gap 63 is preferably annular and centered on the central axis J. The first press fit portion 61, the gap 63, and the second press fit portion 62 are arranged in the order named in an upward (+z) direction. A diameter of the inside surface 32a of the stator core 32 is slightly smaller than a diameter of the outside surface 41b of the cylindrical portion 41.

As illustrated in FIG. 2, the second press fit portion 62 is located above (i.e., on the +z side of) the first press fit portion 61. At least a portion of the second press fit portion 62 is preferably located above a middle 32A of the stator core 32 in the axial direction (i.e., the z-axis direction). The middle 32A of the stator core 32 in the axial direction (i.e., the z-axis direction) will be hereinafter referred to simply as the middle 32A of the stator core 32. The entire second press fit portion 62 is preferably located above the middle 32A of the stator core 32. In addition, the second press fit portion 62 is located above a magnetic center 13A of the rotor magnet 13 in the axial direction. The magnetic center 13A of the rotor magnet 13 in the axial direction will be hereinafter referred to simply as the magnetic center 13A of the rotor magnet 13.

The stator core 32 is preferably a laminated body defined by, for example, ten or more core plates 35 placed one upon another. When H1 denotes a height of the stator core 32, and L1 denotes a distance from a radially inner end to a radially outer end of the stator core 32, the following relationship (1) is satisfied:

$$H1 > L1. \tag{1}$$

Note that the distance from the radially inner end to the radially outer end of the stator core 32 refers to a radial distance from the inside surface 32a of the stator core 32 to a tip of each tooth portion 33.

The second press fit portion 62 preferably includes a press-fit region 64 extending over three or more of the core plates 35. Note that the "three or more of the core plates 35" may include a core plate(s) 35 the axial extent of which is only partially included in the press-fit region 64, in addition to a core plate(s) 35 the axial extent of which is entirely included in the press-fit region 64. The total number of core plates 35 placed one upon another is preferably, for example, eighteen. The press-fit region 64 included in the second press fit portion 62 extends over a sixth or more of the total number of core plates 35 placed one upon another.

As illustrated in FIG. 2, the first press fit portion 61 is located below (i.e., on the −z side of) the second press fit portion 62. The first press fit portion 61 is located below the middle 32A of the stator core 32. The entire first press fit portion 61 is preferably located below the middle 32A of the stator core 32. In addition, the first press fit portion 61 is located below the magnetic center 13A of the rotor magnet 13 in the axial direction. The entire first press fit portion 61 is also preferably located below the magnetic center 13A of the rotor magnet 13.

The gap 63 is located between the first press fit portion 61 and the second press fit portion 62. The gap 63 is located below (i.e., on the −z side of) the second press fit portion 62. In addition, the gap 63 is preferably located above (i.e., on the +z side of) the first press fit portion 61. Portions of the gap 63 are arranged at the middle 32A of the stator core 32, above the middle 32A of the stator core 32, and below the middle 32A of the stator core 32. In addition, portions of the gap 63 are arranged at the magnetic center 13A of the rotor magnet 13, above the magnetic center 13A of the rotor magnet 13, and below the magnetic center 13A of the rotor magnet 13.

The cylindrical portion 41 preferably includes a first groove portion 44 recessed radially inward from the outside surface 41b. The first groove portion 44 is annular and centered on the central axis J. The gap 63 is defined by the first groove portion 44 and the inside surface 32a of the stator core 32. Because the cylindrical portion 41 is tubular, it is easy to define the first groove portion 44 in an outer circumference thereof. Thus, it is easy to produce the gap 63. An adhesive 65 is preferably arranged in the gap 63. In other words, the adhesive 65 is located between the first groove portion 44 and the inside surface 32a of the stator core 32. The degree of surface roughness of a portion of the cylindrical portion 41 which defines the first groove portion 44 is greater than the degree of surface roughness of a portion of the cylindrical portion 41 which defines the outside surface 41b. Thus, the adhesive 65 is more easily held by the first groove portion 44 than by the outside surface 41b.

An axial dimension of the gap 63 is greater than an axial dimension of the first press fit portion 61, and which is also greater than an axial dimension of the second press fit portion 62. In other words, when a1 denotes the axial dimension of the first press fit portion 61, a2 denotes the axial dimension of the second press fit portion 62, and a3 denotes the axial dimension of the gap 63, the following relationship (2) is satisfied:

$$a3 > a1 > a2. \tag{2}$$

The adhesive 65 is arranged to fix the stator core 32 and the cylindrical portion 41 to each other at the gap 63. The stator core 32 and the cylindrical portion 41 are fixed to each other through the adhesive 65 with lower strength than through the first press fit portion 61 and the second press fit portion 62.

When the stator core 32 is press fitted to the cylindrical portion 41, stresses are applied to the stator core 32 at the first press fit portion 61 and the second press fit portion 62. Meanwhile, no stress is applied to the stator core 32 at the gap 63. Accordingly, an excessive stress is not easily applied to an entire axial extent of the stator core 32. Thus, the likelihood that the stator core 32 will be deformed at the time of the press fitting is preferably reduced. This leads to reducing vibrations of the spindle motor 1 due to a deformation of the stator core 32. In addition, because the axial dimension of the gap 63 is greater than that of the first press fit portion 61 and that of the second press fit portion 62, an excessive stress is not easily applied to the stator core 32. Moreover, the adhesive 65 arranged in the gap 63 makes it possible to accomplish the fixture with almost no stress being applied to the stator core 32. Thus, the stator core is securely fixed to the cylindrical portion 41 while significantly reducing or preventing the stress applied to the stator core 32.

The base portion 40 preferably includes a shoulder portion 45 having an outside diameter greater than an outside diameter of the cylindrical portion 41. The shoulder portion 45 is located below (i.e., on the −z side of) the cylindrical portion 41. The shoulder portion 45 is annular and centered on the central axis J. The stator core 32 is arranged to be in contact with the shoulder portion 45. The shoulder portion 45 preferably includes a flat surface 45a with which the stator core 32 is arranged to be in contact. The flat surface 45a extends in a plane (i.e., an xy-plane) perpendicular to the central axis J. Axial positioning of the stator core 32 is accomplished by bringing the stator core 32 into contact with the flat surface 45a.

When H1 denotes the height of the stator core 32, L1 denotes the distance from the radially inner end to the radially outer end of the stator core 32, H2 denotes an axial distance from the shoulder portion 45 to an upper end portion 41c of the cylindrical portion 41, and L2 denotes a distance from a radially inner end to a radially outer end of the cylindrical portion 41, the following relationship (3) is satisfied:

$$H1 > H2 > L1 > L2. \tag{3}$$

Note that the distance from the radially inner end to the radially outer end of the cylindrical portion 41 refers to a radial distance from an inside surface 41a of the cylindrical portion 41 to the outside surface 41b.

The base portion 40 preferably includes a second groove portion 46 recessed radially inward relative to the outside surface 41b. The second groove portion 46 is preferably annular and centered on the central axis J. The second groove portion 46 is located between the first press fit portion 61 and the shoulder portion 45. The second gap portion 46 is located below (i.e., on the −z side of) the first press fit portion 61. In addition, the second gap portion 46 is located above (i.e., on the +z side of) the shoulder portion 45. A lower side surface of the second groove portion 46 is continuous with the flat surface 45a of the shoulder portion 45. The second groove portion 46 preferably has a depth equal or substantially equal to a depth of the first groove portion 44. Note that the second groove portion 46 may be arranged to have a depth different from the depth of the first groove portion 44.

A second gap 66 is defined by the second groove portion 46 and the inside surface 32a of the stator core 32. The adhesive 65 is arranged in the second gap 66. The adhesive 65 preferably enters into the second gap 66 at the time of press fitting of the stator core 32. That is, the second gap 66 functions as a buffer which receives an extra portion of the adhesive 65 when the stator core 32 is brought into contact with the flat surface 45a. Accordingly, the adhesive 65 is prevented or substantially prevented from leaking downward across the shoulder portion 45. Thus, the adhesive 65 is prevented from leaking out around the shoulder portion 45.

The base portion 40 includes an upper surface 40A1 arranged inside of the cylindrical portion 41. The upper surface 40A1 is arranged at an axial level higher than an axial level of (i.e., on the +z side of) the flat surface 45a of the shoulder portion 45. The upper surface 40A1 extends in a plane (i.e., an xy-plane) perpendicular to the central axis J. A position of the upper surface 40A1 and a position of the first press fit portion 61 are arranged to radially overlap with each other. Portions of the first press fit portion 61 are arranged at the same axial level as the axial level of the upper surface 40A1, above the upper surface 40A1, and below (i.e., on the −z side of) the upper surface 40A1. Below the axial level of the upper surface 40A1, the cylindrical portion 41 preferably has an increased thickness. Accordingly, the likelihood that the cylindrical portion 41 will be deformed as a result of receiving a reaction force of a driving torque from the stator core 32 is reduced. A lower portion of the stator core 32 is securely fixed to the cylindrical portion 41 because of the first press fit portion 61. This reduces vibrations of the stator core 32 at the first press fit portion 61.

The outside surface 41b of the cylindrical portion 41 preferably includes a first projecting portion 47 and a second projecting portion 48. Each of the first projecting portion 47 and the second projecting portion 48 is preferably annular and centered on the central axis J. The first press fit portion 61 is preferably defined by the first projecting portion 47 and the inside surface 32a of the stator core 32. Meanwhile, the second press fit portion 62 is preferably defined by the second projecting portion 48 and the inside surface 32a of the stator core 32. The radial position of a radial tip of the first projecting portion 47 is preferably arranged to coincide or substantially coincide with the radial position of a radial tip of the second projecting portion 48, and is also preferably arranged to coincide or substantially coincide with the radial position of a radially inner end of the inside surface 32a of the stator core 32. Accordingly, the amount of press fitting at the first press fit portion 61 and the amount of press fitting at the second press fit portion 62 are the same or substantially the same. As a result, an upper portion and the lower portion of the stator core 32 are preferably held with the same or substantially the same strength. This reduces the vibrations of the stator core 32.

Figure 3:
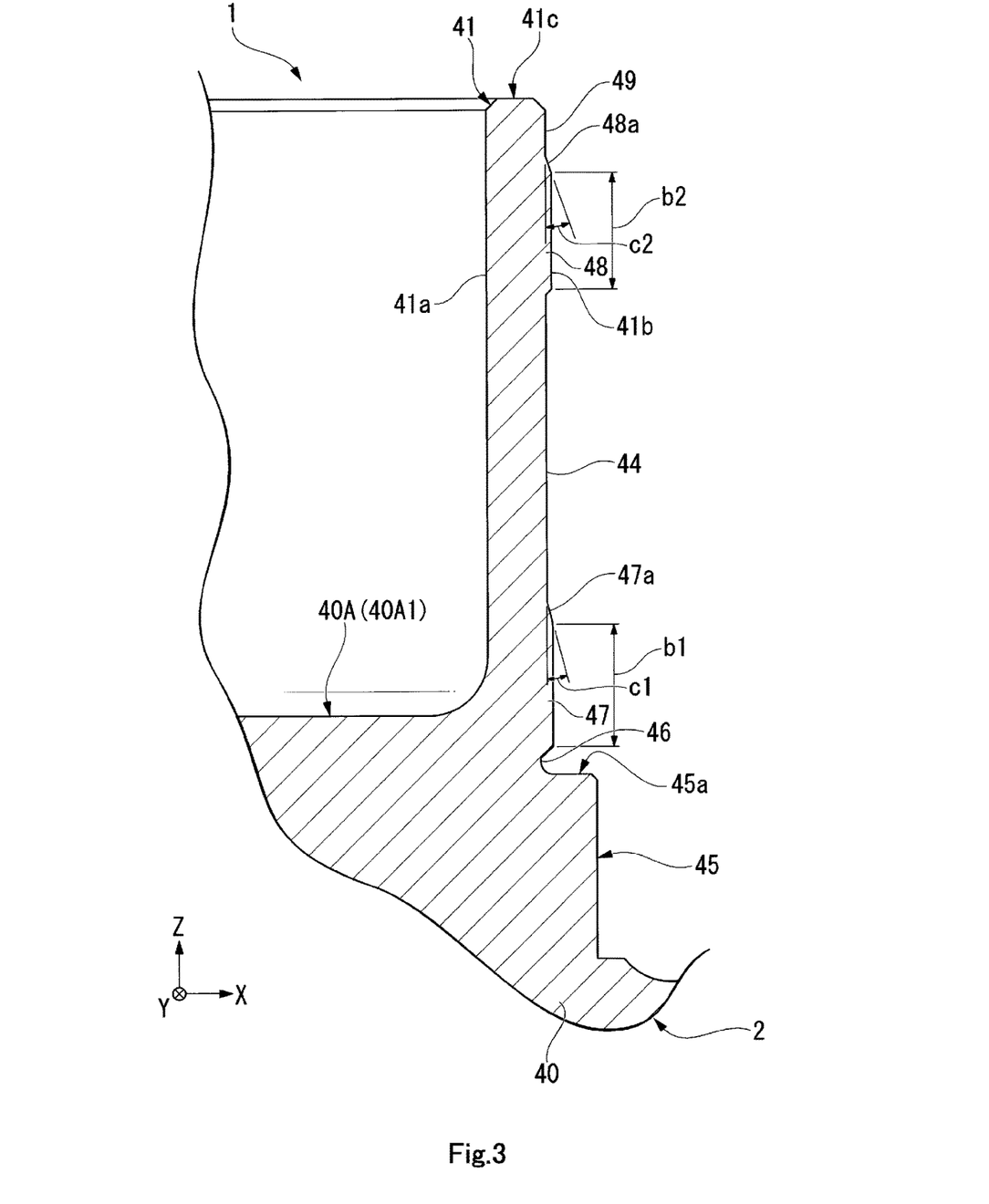
FIG. 3 is a vertical cross-sectional view illustrating a cylindrical portion according to a preferred embodiment of the present invention.

FIG. 3 is a vertical cross-sectional view illustrating the cylindrical portion 41 according to a preferred embodiment of the present invention.

As illustrated in FIG. 3, an axial dimension of the first projecting portion 47 is preferably greater than an axial dimension of the second projecting portion 48. In other words, when b1 denotes the axial dimension of the first projecting portion 47, and b2 denotes the axial dimension of the second projecting portion 48, the following relationship (4) is satisfied:

$$b1 > b2. \tag{4}$$

The first projecting portion 47 is preferably trapezoidal in a cross-section. The first projecting portion 47 includes a first inclined surface 47a at an upper side thereof. In addition, the second projecting portion 48 is preferably trapezoidal in a cross-section. The second projecting portion 48 includes a second inclined surface 48a at an upper side thereof. An angle of inclination of the first inclined surface 47a is smaller than an angle of inclination of the second inclined surface 48a. In other words, when c1 denotes the angle of inclination of the first inclined surface 47a, and c2 denotes the angle of inclination of the second inclined surface 48a, the following relationship (5) is satisfied:

$$c2 > c1. \tag{5}$$

The angle of inclination of the first inclined surface 47a is preferably, for example, about 15 degrees. The angle of inclination of the second inclined surface 48a is preferably, for example, about 20 degrees. Thus, the angle of inclination of the first inclined surface 47a is preferably about three-quarters of the angle of inclination of the second inclined surface 48a. The angle of inclination of the second inclined surface 48a is preferably greater than 0 degrees and equal to or smaller than about 45 degrees, for example. Meanwhile, the angle of inclination of the first inclined surface 47a is preferably greater than 0 degrees and equal to or smaller than about 30 degrees, for example.

The outside surface 41b of the cylindrical portion 41 includes a decreased diameter portion 49 having a diameter smaller than an inside diameter of the stator core 32. The decreased diameter portion 49 is preferably annular and centered on the central axis J. The decreased diameter portion 49 is located above (i.e., on the +z side of) the second press fit portion 62. The decreased diameter portion 49 extends from the second projecting portion 48 to a vicinity of the upper end portion 41c of the cylindrical portion 41. An outside diameter of the decreased diameter portion 49 is preferably equal or substantially equal to an outside diameter of a portion of the cylindrical portion 41 which defines a bottom surface of the first groove portion 44. Accordingly, the decreased diameter portion 49 can be produced by a process which is the same or substantially the same as a process by which the first groove portion 44 is produced.

Figure 4:
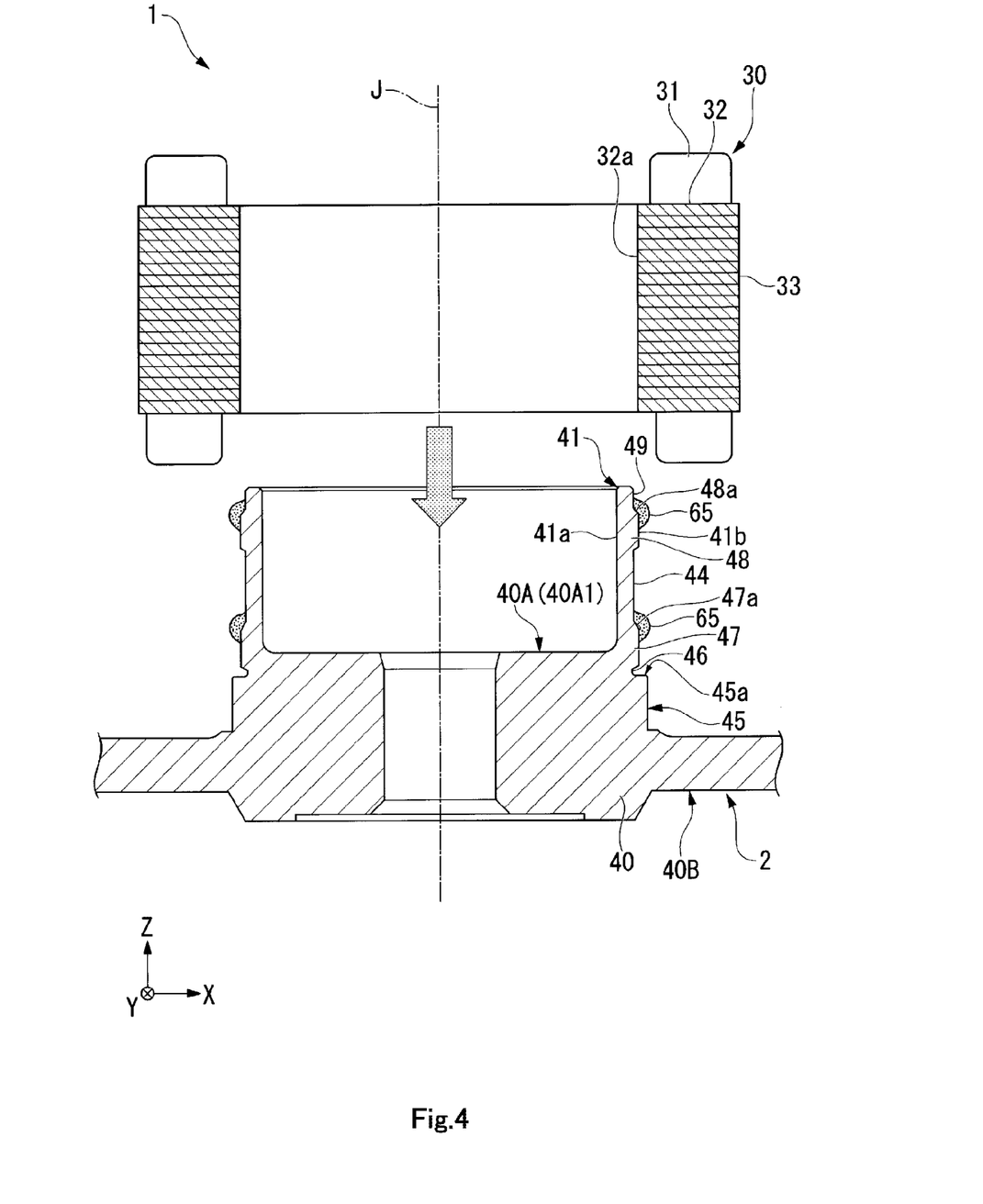
FIG. 4 is an explanatory diagram illustrating a process of fitting a stator portion to a base portion according to a preferred embodiment of the present invention.

FIG. 4 is an explanatory diagram illustrating a process of fitting the stator portion 30 to the base portion 40 according to a preferred embodiment of the present invention.

First, the adhesive 65 is located on the cylindrical portion 41 of the base portion 40 as illustrated in FIG. 4. The adhesive 65 is preferably a thermosetting adhesive. The adhesive 65 is preferably arranged to cover the first inclined surface 47a of the first projecting portion 47. In addition, the adhesive 65 is preferably arranged to cover the second inclined surface 48a of the second projecting portion 48. When the stator core 32 is press fitted to the cylindrical portion 41, the adhesive 65 functions as a lubricant as well. In other words, the adhesive 65 reduces friction between the inside surface 32a of the stator core 32 and the outside surface 41b of the cylindrical portion 41. Note that the adhesive 65 may not necessarily be the thermosetting adhesive, but may be a UV-curing adhesive, an anaerobic adhesive, or the like. Also note that the adhesive arranged to cover the first inclined surface 47a and the adhesive arranged to cover the second inclined surface 48a may either be of the same type or be different types of adhesives.

Next, the stator core 32 is fitted to the decreased diameter portion 49 of the cylindrical portion 41. Because the outside diameter of the decreased diameter portion 49 is smaller than the inside diameter of the stator core 32, the decreased diameter portion 49 defines and functions as a guide for the stator core 32. In addition, the decreased diameter portion 49 is not press fitted to the stator core 32. Accordingly, after the stator core 32 is fitted to the decreased diameter portion 49, the stator core 32 is capable of being detached from the decreased diameter portion 49. Therefore, it is possible to fit the stator core 32 to the decreased diameter portion 49 such that the stator core 32 is horizontally oriented. Thus, the stator core 32 is preferably prevented from being press fitted such that the stator core 32 is inclined with respect to the cylindrical portion 41.

Next, the stator core 32 is press fitted to the cylindrical portion 41. A press fitting apparatus (not shown) is used for the press fitting of the stator core 32. Once the stator core 32 is moved downward (i.e., to the −z side), the stator core 32 passes the second projecting portion 48 with the adhesive 65 functioning as the lubricant. When the stator core 32 passes the second projecting portion 48, the adhesive 65 is spread from the second inclined surface 48a onto the second projecting portion 48, and enters into the first groove portion 44. If the stator core 32 is moved farther downward (i.e., to the −z side), the stator core 32 passes the first projecting portion 47. When the stator core 32 passes the first projecting portion 47, the adhesive 65 is spread from the first inclined surface 47a onto the first projecting portion 47, and enters into the second groove portion 46.

In this fitting process, the stator core 32 is press fitted to the cylindrical portion 41 with a press-fitting jig which is in contact with an upper end portion of the stator core 32. Since the upper end portion 41c of the cylindrical portion 41 is arranged at an axial level lower than an axial level of the upper end portion of the stator core 32 as illustrated in FIG. 2, the press-fitting jig does not contact the upper end portion 41c of the cylindrical portion 41. Thus, the stator core 32 is able to be press fitted to the cylindrical portion 41 with high accuracy.

If the stator core 32 is moved farther downward (i.e., to the −z side), the stator core 32 will be brought into contact with the flat surface 45a of the shoulder portion 45. Once the stator core 32 is brought into contact with the flat surface 45a, the fixing portion 60, at which the first press fit portion 61, the second press fit portion 62, and the gap 63 as illustrated in FIG. 2 are arranged, is defined. As illustrated in FIG. 3, the axial dimension of the first projecting portion 47 is greater than the axial dimension of the second projecting portion 48. Thus, a distance over which the stator core 32 passes the second projecting portion 48 is shorter than a distance over which the stator core 32 passes the first projecting portion 47. This facilitates press fitting of the stator core 32 to an upper portion of the cylindrical portion 41.

Meanwhile, because the axial dimension of the first projecting portion 47 is greater than the axial dimension of the second projecting portion 48, the stator core 32 is able to be fixed to a lower portion of the cylindrical portion 41 over a large area. This contributes to reducing the vibrations of the stator core 32. In addition, the angle of inclination of the first inclined surface 47a is smaller than the angle of inclination of the second inclined surface 48a. This makes it easier to guide the adhesive 65 as the lubricant into a gap between the inside surface 32a of the stator core 32 and the first projecting portion 47. This facilitates press fitting of the stator core 32 to the lower portion of the cylindrical portion 41.

As illustrated in FIG. 2, at least a portion of the second press fit portion 62 is located above the middle 32A of the stator core 32. Therefore, an upper portion of the stator core 32 is able to be fixed to the base portion 40. If only the lower portion of the stator core were press fitted to the base portion, an excitation force generated by the driving torque might cause a deformation of the upper portion of the stator core because the upper portion of the stator core is not securely fixed to the base portion, and this might cause a vibration of the spindle motor. In contrast, according to the structure illustrated in FIG. 2, the upper portion of the stator core 32 is fixed to the base portion 40, and is securely fixed to the base portion 40 as the lower portion of the stator core 32 is securely fixed to the base portion 40. This leads to reducing the vibrations of the spindle motor 1.

The first press fit portion 61 is located below the middle 32A of the stator core 32. When both the upper portion and the lower portion of the stator core 32 are fixed to the base portion 40, a frequency of each natural mode that depends on the shape of the stator core 32 is shifted to the higher side. The shift of the frequency of each natural mode to the higher side results in a decreased amplitude of vibration of the stator core 32. Moreover, the adhesive 65 arranged in the gap 63 further decreases the amplitude of vibration of the stator core 32. Thus, the vibration of the spindle motor 1 is reduced. In addition, the second press fit portion 62 is located above the magnetic center 13A of the rotor magnet 13. This increases the strength of fixing of the stator core 32, which contributes to preventing a deformation of the stator core 32 due to the exciting force of the driving torque.

Thus, a deformation of the stator core 32, which satisfies the dimensional relationship H1>L1, where H1 denotes the height of the stator core 32, and L1 denotes the distance from the radially inner end to the radially outer end of the stator core 32, as illustrated in FIG. 2 is significantly reduced or prevented. Moreover, the relationship H1>H2>L1>L2, where H2 denotes the axial distance from the shoulder portion 45 to the upper end portion of the cylindrical portion 41, and L2 denotes the distance from the radially inner end to the radially outer end of the cylindrical portion 41, is satisfied. Since H2>L1, the second press fit portion 62 is able to be provided above a portion having a dimension of H2−L1, and this leads to preventing a deformation of the stator core 32 having a great axial dimension. Accordingly, even when the stator core 32 is a laminated body defined by, for example, ten or more core plates 35 placed one upon another, a reduction in the vibrations of the spindle motor 1 is achieved.

Note that structures described below may be adopted in other preferred embodiments of the present invention. In the following description, members or portions that have their equivalents in the above-described preferred embodiment are denoted by the same reference numerals as those of their equivalents in the above-described preferred embodiment, and descriptions thereof will be provided in brief or will be omitted.

Figure 5:
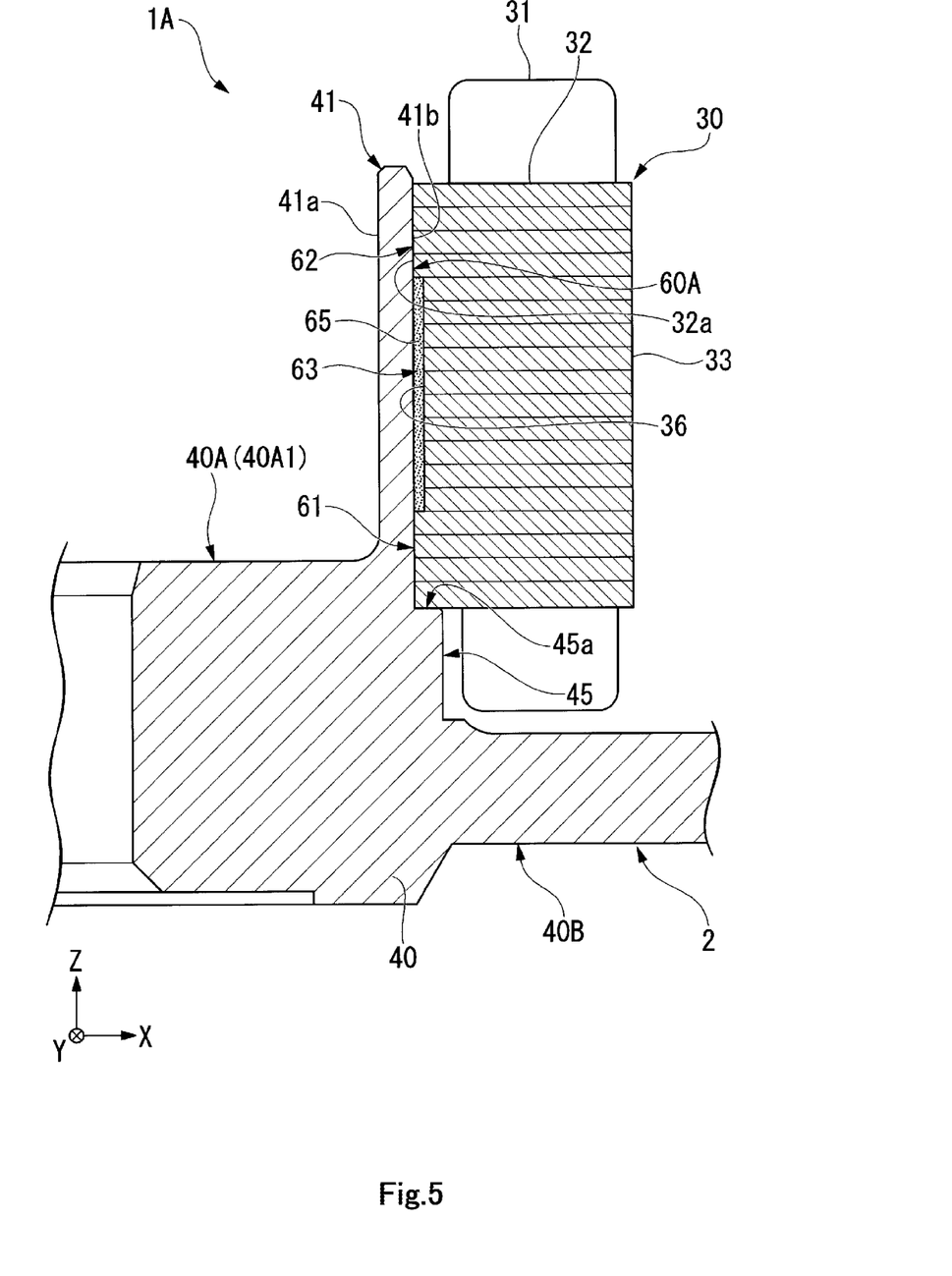
FIG. 5 is a vertical cross-sectional view illustrating a fixing portion according to an example modification of a preferred embodiment of the present invention.

FIG. 5 is a vertical cross-sectional view illustrating a fixing portion 60A according to an example modification of a preferred embodiment of the present invention.

As illustrated in FIG. 5, a spindle motor 1A preferably includes the fixing portion 60A, at which an inside surface 32a of a stator core 32 and an outside surface 41b are fixed to each other. The stator core 32 preferably includes a core groove portion 36 recessed radially outward in the inside surface 32a thereof. The core groove portion 36 is preferably annular and centered on a central axis J. A gap 63 is defined by the core groove portion 36 and the outside surface 41b of a cylindrical portion 41. An adhesive 65 is arranged in the gap 63. In addition, a first press fit portion 61 and a second press fit portion 62 are preferably defined by the inside surface 32a of the stator core 32 and the outside surface 41b of the cylindrical portion 41. At the fixing portion 60A, the first groove portion 44 may not be provided in a base portion 40.

Figure 6:
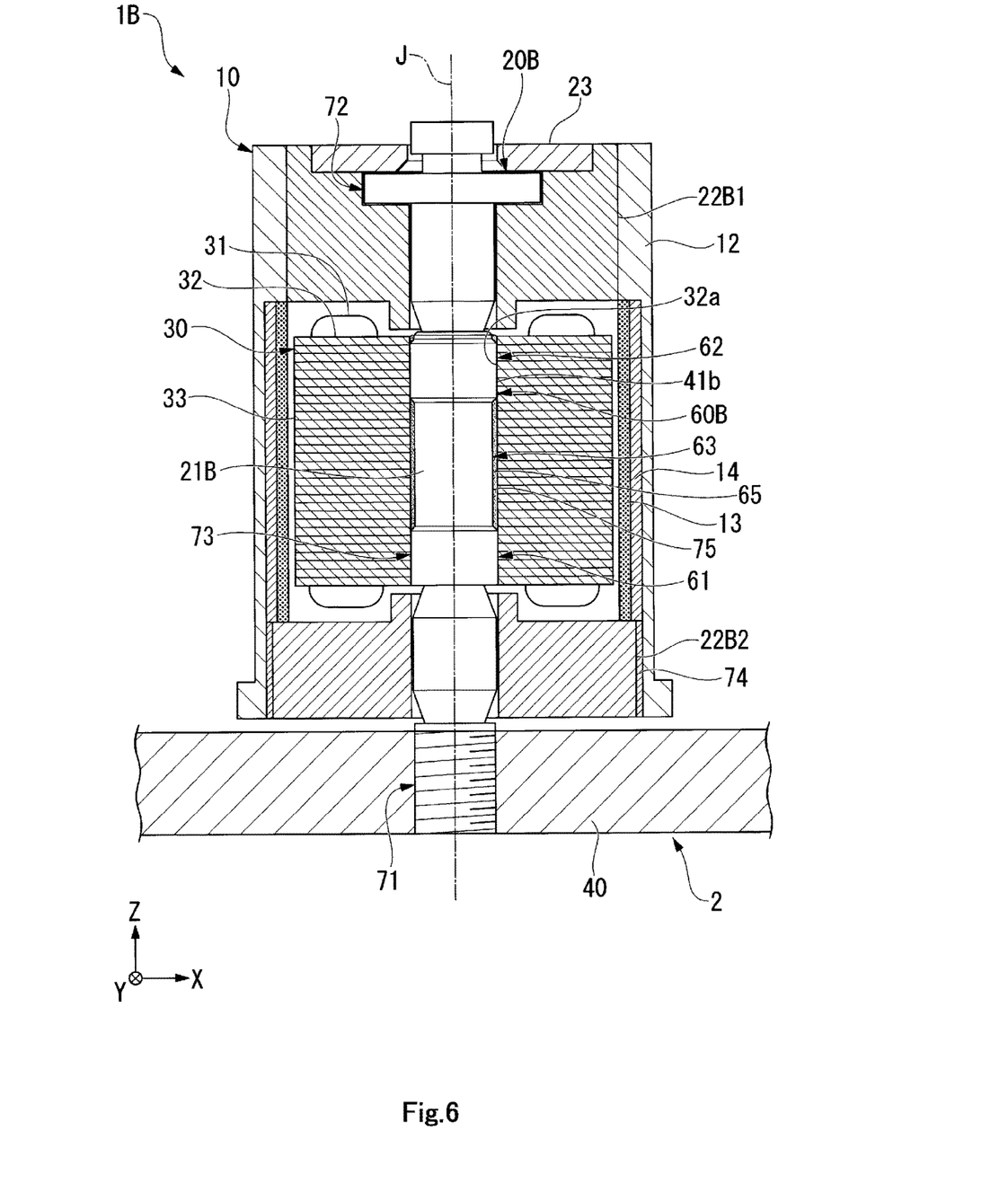
FIG. 6 is a vertical cross-sectional view illustrating a spindle motor according to another preferred embodiment of the present invention.

FIG. 6 is a vertical cross-sectional view illustrating a spindle motor 1B according to another preferred embodiment of the present invention. As illustrated in FIG. 6, the spindle motor 1B preferably includes a fixing portion 60B at which an inside surface 32a of a stator core 32 and an outside surface 41b are fixed to each other. A stationary portion 2 includes the outside surface 41b, a base portion 40, and a shaft 21B. The shaft 21B is fixed to the base portion 40. The shaft 21B extends in an axial direction. The shaft 21B preferably includes a screw portion 71 fixed to the base portion 40, a thrust plate 72 located above the screw portion 71, and a stator core support portion 73 located between the screw portion 71 and the thrust plate 72. The shaft 21B and sleeves 22B1 and 22B2 are arranged to together define a bearing portion 20B.

The sleeve 22B1 is located above the stator core support portion 73. The sleeve 22B1 is fitted into a rotor hub 12. In addition, a thrust bushing 23 located opposite to an upper surface of the thrust plate 72 is fixed to the sleeve 22B1. Meanwhile, the sleeve 22B2 is located below the stator core support portion 73. The sleeve 22B2 is preferably fixed to the rotor hub 12 through an adhesive 74. The shaft 21B and each of the sleeves 22B1 and 22B2 are located opposite to each other with a gap therebetween. A lubricating oil or a gas is preferably arranged in the gap. In addition, a yoke 14, which defines a magnetic path, is preferably provided between the rotor hub 12 and a rotor magnet 13.

The outside surface 41b is provided by a portion of the shaft 21B. The shaft 21B includes a shaft groove portion 75 recessed radially inward from the outside surface 41b. The shaft groove portion 75 is preferably annular and centered on a central axis J. A gap 63 is defined by the shaft groove portion 75 and the inside surface 32a of the stator core 32. An adhesive 65 is arranged in the gap 63. In addition, a first press fit portion 61 and a second press fit portion 62 are preferably defined by the inside surface 32a of the stator core 32 and the outside surface 41b of the shaft 21B. At the fixing portion 60B, the first groove portion 44 may not be arranged in the base portion 40.

Also note that only a portion of the second press fit portion 62 may be located above a middle 32A of the stator core 32, for example. The second press fit portion 62 may include a portion which radially overlaps with the middle 32A of the stator core 32.

Also note that one or more press fit portions different from the first press fit portion 61 and the second press fit portion 62 may be provided between the first press fit portion 61 and the second press fit portion 62 if so desired. For example, a third press fit portion may be provided between the first press fit portion 61 and the second press fit portion 62.

Also note that, although each of the first press fit portion 61, the second press fit portion 62, and the gap 63 preferably has an annular shape with the central axis J as a center, this is not essential to the present invention. For example, the first press fit portion 61 and/or the second press fit portion 62 may not be annular, and may be defined by a plurality of portions spaced from one another and arranged in the circumferential direction. Also note that a plurality of first press fit portions 61 and a plurality of second press fit portions 62 may or may not be arranged to axially overlap with each other. Also note that only one of the first press fit portion 61 and the second press fit portion 62 may be annular, with the other of the first press fit portion 61 and the second press fit portion 62 being defined by a plurality of press fit portions. Also note that the gap 63 may not be annular, and may be defined by a plurality of portions spaced from one another and arranged in the circumferential direction.

Also note that the first projecting portion 47 and/or the second projecting portion 48 may be defined by a plurality of portions spaced from one another and arranged in the circumferential direction. Also note that the first groove portion 44 and/or the core groove portion 36 may be defined by a plurality of portions spaced from one another and arranged in the circumferential direction.

Also note that the stator core 32 may alternatively be a laminated body defined by less than ten core plates 35 placed one upon another.

Note that features as described above may be combined appropriately as long as no conflict arises.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor comprising:
   a stationary portion; and
   a rotating portion configured to rotate about a central axis extending in a vertical direction with respect to the stationary portion; wherein
   the stationary portion includes:
      a stator portion including a stator core including a plurality of tooth portions, and coils wound around the plurality of tooth portions; and
      an outside surface which extends in an axial direction parallel or substantially parallel to the central axis and which is centered on the central axis;
   a fixing portion at which an inside surface of the stator core and the outside surface are fixed to each other is provided;
   the fixing portion includes a first press fit portion, a second press fit portion, and a gap arranged therein;
   the gap is located between the first press fit portion and the second press fit portion;
   the second press fit portion is located above the first press fit portion, and at least a portion of the second press fit portion is located above a middle of the stator core in the axial direction;
   the stationary portion includes a base portion;
   the base portion includes a tubular portion including the outside surface and which extends in the axial direction;
   the cylindrical portion includes a first groove portion recessed radially inward from the outside surface;
   the gap is defined by the first groove portion and the inside surface of the stator core; and
   a first adhesive is located between the first groove portion and the inside surface of the stator core.

2. The spindle motor according to claim 1, wherein the first press fit portion is located below the middle of the stator core in the axial direction.

3. The spindle motor according to claim 1, further comprising a second adhesive arranged in the gap.

4. The spindle motor according to claim 3, wherein an axial dimension of the gap is greater than an axial dimension of the first press fit portion and greater than an axial dimension of the second press fit portion.

5. The spindle motor according to claim 4, wherein H1>L1, where H1 denotes a height of the stator core, and L1 denotes a distance from a radially inner end to a radially outer end of the stator core.

6. The spindle motor according to claim 1, wherein an axial dimension of the gap is greater than an axial dimension of the first press fit portion and greater than an axial dimension of the second press fit portion.

7. The spindle motor according to claim 1, wherein H1>L1, where H1 denotes a height of the stator core, and L1 denotes a distance from a radially inner end to a radially outer end of the stator core.

8. The spindle motor according to claim 7, wherein
the stator core is a laminated body including ten or more core plates placed one upon another; and
the second press fit portion includes a press-fit region extending over three or more of the core plates.

9. The spindle motor according to claim 1, wherein
the rotating portion includes a rotor magnet located opposite to each coil with a gap therebetween; and
the second press fit portion is located above a magnetic center of the rotor magnet in the axial direction.

10. The spindle motor according to claim 1, wherein
the base portion further includes:
a shoulder portion having an outside diameter greater than an outside diameter of the cylindrical portion;
the stator core is in contact with the shoulder portion; and
H1>H2>L1>L2, where H1 denotes a height of the stator core, L1 denotes a distance from a radially inner end to a radially outer end of the stator core, H2 denotes an axial distance from the shoulder portion to an upper end portion of the cylindrical portion, and L2 denotes a distance from a radially inner end to a radially outer end of the cylindrical portion.

11. The spindle motor according to claim 10, wherein
the base portion includes a second groove portion recessed radially inward relative to the outside surface;
the second groove portion is located between the first press fit portion and the shoulder portion;
the second groove portion and the inside surface of the stator core together define a second gap therebetween; and
a second adhesive is arranged in the second gap.

12. The spindle motor according to claim 10, wherein
the shoulder portion includes a flat surface with which the stator core is arranged to be in contact;
the base portion includes an upper surface arranged inside of the cylindrical portion; and
the upper surface is arranged at an axial level higher than an axial level of the flat surface.

13. The spindle motor according to claim 1, wherein
the outside surface includes a first projecting portion and a second projecting portion;
the first press fit portion is defined by the first projecting portion and the inside surface of the stator core;
the second press fit portion is defined by the second projecting portion and the inside surface of the stator core; and
an axial dimension of the first projecting portion is greater than an axial dimension of the second projecting portion.

14. The spindle motor according to claim 13, wherein
the first projecting portion includes a first inclined surface at an upper side thereof;
the second projecting portion includes a second inclined surface at an upper side thereof; and
an angle of inclination of the first inclined surface is smaller than an angle of inclination of the second inclined surface.

15. The spindle motor according to claim 1, wherein
the outside surface includes a decreased diameter portion having a diameter smaller than an inside diameter of the stator core; and
the decreased diameter portion is located above the second press fit portion.

16. A disk drive apparatus comprising:
the spindle motor according to claim 1;
a disk supported by the spindle motor; and
an access portion configured to perform at least one of reading and writing of information from or to the disk.

* * * * *